United States Patent
Shekhar et al.

(10) Patent No.: US 11,853,940 B1
(45) Date of Patent: Dec. 26, 2023

(54) SYSTEM AND METHOD OF ROOT CAUSE ANALYSIS OF OBJECTIVE VIOLATIONS

(71) Applicant: JDA Software Group, Inc., Scottsdale, AZ (US)

(72) Inventors: Tushar Shekhar, Katihar (IN); Narasimha Kamath, Bangalore (IN)

(73) Assignee: Blue Yonder Group, Inc., Scottsdale, AZ (US)

( * ) Notice: Subject to any disclaimer, the term of this patent is extended or adjusted under 35 U.S.C. 154(b) by 444 days.

(21) Appl. No.: 14/738,546

(22) Filed: Jun. 12, 2015

Related U.S. Application Data

(60) Provisional application No. 62/174,577, filed on Jun. 12, 2015.

(51) Int. Cl.
*G06Q 10/0631* (2023.01)
*G06Q 10/087* (2023.01)

(52) U.S. Cl.
CPC ..... *G06Q 10/06315* (2013.01); *G06Q 10/087* (2013.01)

(58) Field of Classification Search
CPC ............ G06Q 10/06315; G06Q 10/087
See application file for complete search history.

(56) References Cited

U.S. PATENT DOCUMENTS

| | | | |
|---|---|---|---|
| 7,672,862 B1 | 3/2010 | Venkatasubramanyan et al. | |
| 7,788,119 B2 * | 8/2010 | Najmi | G06Q 10/06 705/7.22 |
| 8,429,035 B1 * | 4/2013 | Kamath | G06Q 10/0633 700/102 |
| 8,620,729 B2 | 12/2013 | Srinivasa et al. | |
| 8,838,578 B2 | 9/2014 | Yoon et al. | |
| 9,224,110 B2 * | 12/2015 | Moorkanat | G06Q 10/06315 |
| 9,805,330 B2 * | 10/2017 | Surendra | G06Q 10/06 |
| 2012/0130726 A1 * | 5/2012 | Subramanian | G06F 17/11 705/1.1 |

OTHER PUBLICATIONS

Ehap H. Sabri and Benita M. Beamon, A multi-objective approach to simultaneous strategic and operational planning in supply chain design, Omega 28 (2000) 581-598.

(Continued)

*Primary Examiner* — Deirdre D Hatcher
(74) *Attorney, Agent, or Firm* — Spencer Fane LLP; Steven J. Laureanti

(57) ABSTRACT

A system and method are disclosed including a supply chain network including one or more entities, one or more items and a plan explainer. The plan explainer generates an optimum inventory level based on a root cause of a goal violation by modeling the supply chain network and one or more business objectives as a hierarchy of objective functions. The plan explainer also solves the hierarchy of objective functions, stores plan explanation data and retrieves the plan explanation data. The plan explainer further generates the root cause of the goal violation by parsing the retrieved plan explanation data and calculates the optimum inventory level based on the root cause of the goal violation. In response to the calculated optimum inventory level, at least one of the one or more entities adjusts inventory levels of the one or more items according to the optimum inventory level. Other embodiments are also disclosed.

17 Claims, 4 Drawing Sheets

(56) References Cited

OTHER PUBLICATIONS

J. Mula, R. Poler, J.P. Garcia-Sabater and F.C.Lario, Models for production planning under uncertainty: A review, International journal of production economics 103 (2006) 271-285.
Young-Jou Lai, Hierarchical Optimization: A satisfactory solution, Fuzzy Sets and Systems 77 (1996) 321-335.
Torabi S.A. & Hassini E., An interactive possibilistic programming approach for multiple objective supply chain master planning, Fuzzy Sets and System 159 (2008) 193-214.

* cited by examiner

SYSTEM AND METHOD OF ROOT CAUSE ANALYSIS OF OBJECTIVE VIOLATIONS

CROSS-REFERENCE TO RELATED APPLICATIONS

The present disclosure is related to that disclosed in the U.S. Provisional Application No. 62/174,577, filed Jun. 12, 2015, entitled "System and Method of Root Cause Analysis of Objective Violations and Query Analysis." U.S. Provisional Application No. 62/174,577 is assigned to the assignee of the present application. The subject matter disclosed in U.S. Provisional Application No. 62/174,577 is hereby incorporated by reference into the present disclosure as if fully set forth herein. The present invention hereby claims priority under 35 U.S.C. § 119(e) to U.S. Provisional Application No. 62/174,577.

TECHNICAL FIELD

The disclosure relates generally to a system and method of supply chain master planning, and, more particularly, to a system and method of root cause analysis for goal violations of supply chain network plans derived from multi-objective hierarchical linear optimization.

BACKGROUND

Supply chain master planning broadly involves determining and evaluating decisions on the allocation of material and capacity within a supply chain network to meet consumer demand. A typical supply chain plan includes the acquisition of raw materials, the conversion of these into finished goods, and the distribution of the finished goods to downstream supply chain entities, such as warehouses and buyers. However, a supply chain faces various constraints such as production capacity, supply, and lead-time for resources and entities along with business objectives, which may be hierarchical in nature. Similarly, supply chain problems nearly always contain multiple conflicting objectives. Such plans comprise tradeoffs between constraints and objectives that often lead to goal violations.

One method commonly used to generate a plan solution based on a supply chain problem with conflicting objectives is to represent the plan as a single objective function with penalty weights assigned to multiple component objective functions. This solution is not ideal and is not an accurate representation of the plan problem because it relies on the comparison of non-equivalent vectors. Additionally, the assigned penalties are artificially derived and difficult to calculate.

A second approach is to categorize the relative importance of objectives based on business needs and solve the hierarchy of objective functions using hierarchical optimization. However, due to the hierarchical nature of the problem, the ultimate solution is far removed from the root cause of any goal violation and so useful root cause analysis according to traditional methods becomes impossible for complex plan problems. Therefore, previous methods of providing root cause analysis to the solution of supply chain planning problems have proven inadequate.

BRIEF DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, wherein:

DETAILED DESCRIPTION

Figure 1:
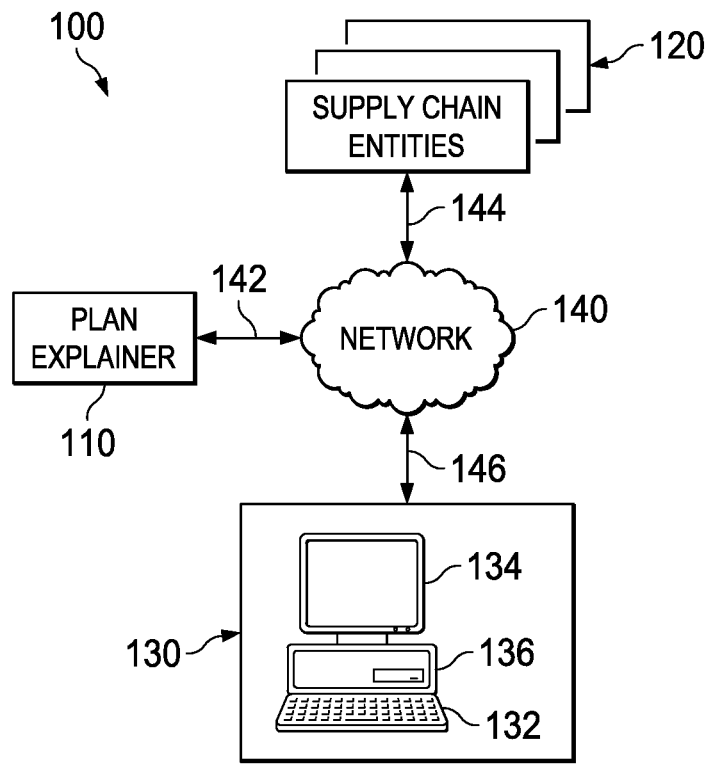
FIG. 1 illustrates an exemplary supply chain network according to a first embodiment.

Linear programming, hierarchical multi-objective optimization, heuristics for root cause analysis of objective violations, and applications presented herein are described below in the drawings and detailed description. Unless specifically noted, it is intended that the words and phrases herein be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that embodiments described herein may be practiced without these specific details. In other instances, known structures and devices are shown and/or discussed more generally in order to avoid obscuring the invention. In many cases, a description of the operation is sufficient to enable one of ordinary skill in the applicable art to implement the various forms of the invention. It should be appreciated that there are many different and alternative configurations, devices and technologies to which the disclosed inventions may be applied. The full scope of the present disclosure is not limited to the examples described below.

FIG. 1 illustrates an exemplary supply chain network 100 according to a first embodiment. Supply chain network 100 comprises plan explainer 110, one or more supply chain entities 120, computers 130, a network 140, and communication links 142, 144, and 146. Although a single plan explainer 110, one or more supply chain entities 120, a single computer 130, and a single network 140, are shown and described; embodiments contemplate any number of plan explainer 110, any number of supply chain entities 120, any number of computers 130, or any number of networks 140, according to particular needs.

In a first embodiment, supply chain network 100 exploits the efficiency of multi-objective hierarchical linear optimization to provide root cause explanations of objective violations for large-scale supply chain master planning problems of supply chain network 100. In addition, as described below in more detail, plan explainer 110 parses a multi-objective hierarchical linear optimization, applies heuristics to analyze logged data and provides interactive analysis of exceptions and goal violations to determine a root cause explanation.

In one embodiment, plan explainer 110 considers various decision variables, business constraints, goals and objectives of one or more supply chain entities 120 when determining a root cause explanation. As described below in more detail, these various decision variables, business constraints, goals and objectives may prevent one or more supply chain entities 120 from satisfying demand, and may delay demand from being satisfied during a particular planning horizon. In addition, or as an alternative, the business constraints, goals and objectives of one or more supply chain entities 120 may include, but are not limited to, meeting various types of demand, adhering to product mix or safety stock limits, minimizing inventory, maintaining specific material or capacity, utilizing particular resources, maintaining proportional sourcing, reducing use of alternate materials, and optimizing profit.

Supply chain network 100 may operate on one or more computers 130 that are integral to or separate from the hardware and/or software that support plan explainer 110 and one or more supply chain entities 120. Computers 130 may include any suitable input device 132, such as a keypad, mouse, tablet, mobile, touch screen, microphone, or other device to input information. An output device 134 may convey information associated with the operation of supply chain network 100, including digital or analog data, visual information, or audio information. Computers 130 may include fixed or removable non-transitory computer-readable storage media, such as magnetic computer disks, CD-ROM, or other suitable non-transitory computer-readable storage media to receive output from and provide input to supply chain network 100. Computers 130 may include one or more processors 136 and associated memory to execute instructions and manipulate information according to the operation of supply chain network 100.

Although a single computer 130 is shown and described in FIG. 1, plan explainer 110 and one or more supply chain entities 120 may each operate on separate computers 130 or may operate on one or more shared computers 130. Each of the one or more computers 130 may be a work station, personal computer (PC), network computer, tablets, notebook computer, personal digital assistant (PDA), cell phone, smartphone, telephone, wireless data port, or any other suitable computing device. In an embodiment, one or more users may be associated with plan explainer 110. These one or more users may include, for example, a "manager" or a "planner" handling parsing of multi-objective hierarchical linear optimization, applying heuristics to analyze logged data, providing analysis of exceptions and goal violations and/or one or more related tasks within supply chain network 100. In addition, or as an alternative, these one or more users within supply chain network 100 may include, for example, one or more computers 130 programmed to autonomously handle, among other things, parsing data, analyzing exceptions and violations, and adjusting of various levels of safety stock and inventory and/or one or more related tasks within supply chain network 100.

In one embodiment, one or more supply chain entities 120 represent one or more supply chain networks, such as, for example, suppliers, manufacturers, distribution centers, retailers, and/or customers. A supplier may be any suitable entity that offers to sell or otherwise provides one or more items (i.e., materials, components, or products) to one or more manufacturers. In addition, or as an alternative, each of the one or more items may be represented in supply chain network 100 by an identifier, including, for example, Stock-Keeping Unit (SKU) or Universal Product Code (UPC) information.

A manufacturer may be any suitable entity that manufactures at least one product. A manufacturer may use one or more items during the manufacturing process to produce any manufactured, fabricated, assembled, or otherwise processed item, material, component, good or product. In one embodiment, a product represents an item ready to be supplied to, for example, another supply chain entity in supply chain network 100, such as a supplier, an item that needs further processing, or any other item. A manufacturer may, for example, produce and sell a product to a supplier, another manufacturer, a distribution center, retailer, a customer, or any other suitable person or entity. A distribution center may be any suitable entity that offers to store or otherwise distributes at least one product to one or more retailers and/or customers. A retailer may be any suitable entity that obtains one or more products to sell to one or more customers.

Although one or more supply chain entities 120 is shown and described as separate and distinct entities, the same entity may simultaneously act as any one of the one or more supply chain entities 120. For example, one or more supply chain entities 120 acting as a manufacturer can produce a product, and the same entity can act as a supplier to supply an item to itself or another supply chain entity 120. Although one example of a supply chain network is shown and described, embodiments contemplate any operational environment and/or supply chain network, without departing from the scope described herein.

In one embodiment, plan explainer 110 is coupled with network 140 using communications link 142, which may be any wireline, wireless, or other link suitable to support data communications between plan explainer 110 and network 140 during operation of supply chain network 100. One or more supply chain entities 120 are coupled with network 140 using communications link 144, which may be any wireline, wireless, or other link suitable to support data communications between one or more supply chain entities 120 and network 140 during operation of supply chain network 100. Computers 130 are coupled with network 140 using communications link 146, which may be any wireline, wireless, or other link suitable to support data communications between computers 130 and network 140 during operation of supply chain network 100.

Although communication links 142, 144, and 146 are shown as generally coupling plan explainer 110, one or more supply chain entities 120, and computers 130 to network 140, plan explainer 110, one or more supply chain entities 120, and computers 130 may communicate directly with plan explainer 110, one or more supply chain entities 120, and computers 130, according to particular needs.

In another embodiment, network 140 includes the Internet and any appropriate local area networks (LANs), metropolitan area networks (MANS), or wide area networks (WANs) coupling plan explainer 110, one or more supply chain entities 120, and computers 130. For example, data may be maintained by plan explainer 110 at one or more locations external to plan explainer 110 and one or more supply chain entities 120 and made available to one or more associated users of one or more supply chain entities 120 using network 140 or in any other appropriate manner. Those skilled in the art will recognize that the complete structure and operation of communication network 140 and other components within supply chain network 100 are not depicted or described. Embodiments may be employed in conjunction with known communications networks and other components.

In accordance with the principles of embodiments described herein, plan explainer 110 parses a multi-objective hierarchical linear optimization, applies heuristics to analyze logged data and provides interactive analysis of exceptions and goal or objective violations to determine a root cause explanation. Plan explainer 110 further generates root cause explanations of multiple business objectives solved hierarchically in one or more supply master planning problems of supply chain network 100. Furthermore, plan explainer 110 adjusts the product mix ratios, inventory levels at various stocking points, and proportional or alternative sourcing of one or more supply chain entities 120 based on various supply chain exceptions, constraints, rules, goals and/or objective violations.

Figure 2:
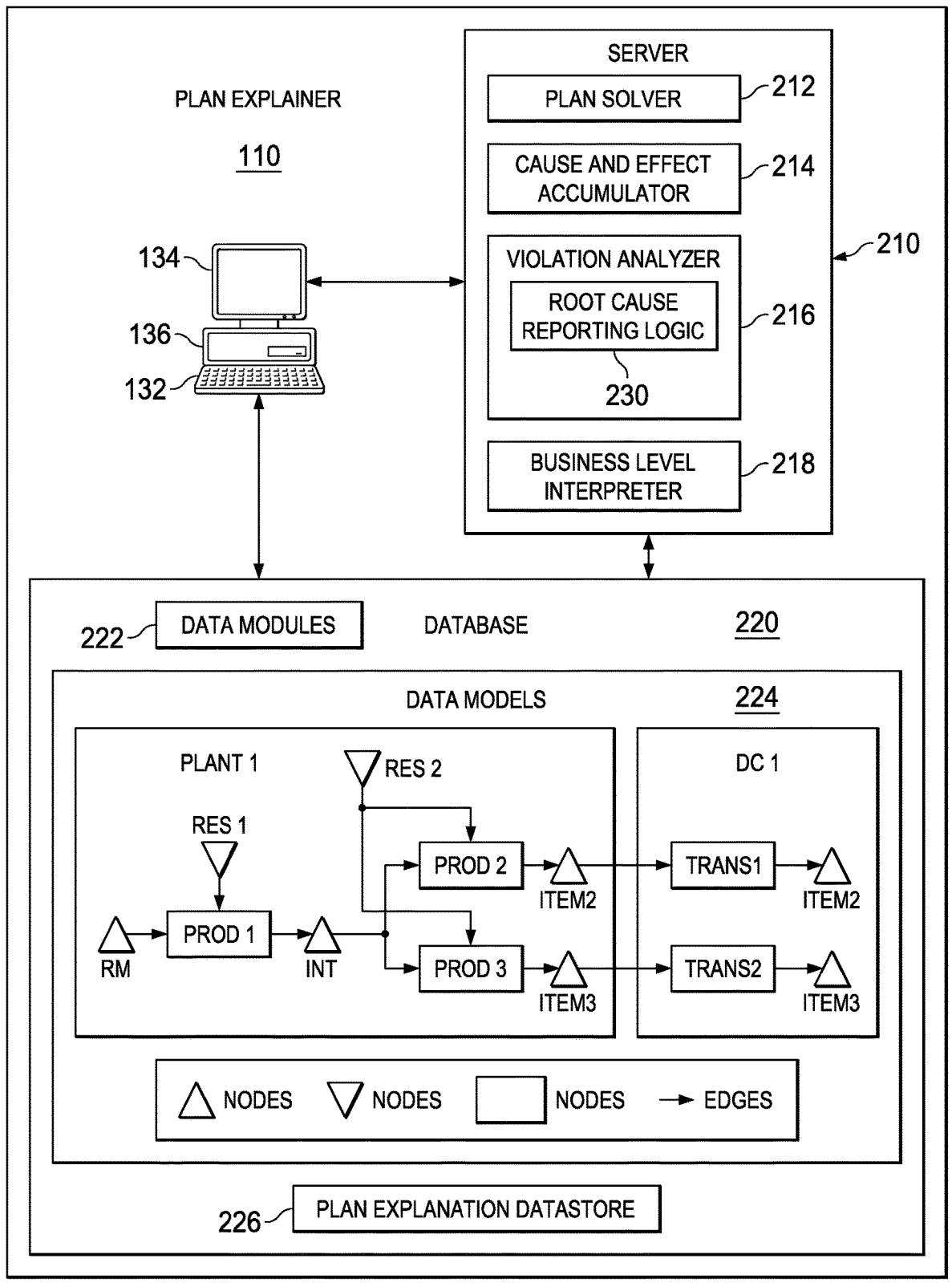
FIG. 2 illustrates the plan explainer of FIG. 1 in greater detail in accordance with the first embodiment.

FIG. 2 illustrates plan explainer 110 of FIG. 1 in greater detail in accordance with the first embodiment. As discussed above, plan explainer 110 comprises one or more computers at one or more locations including associated input devices, output devices, non-transitory computer-readable storage media, processors, memory, or other components for receiving, processing, storing, and communicating information according to the operation of supply chain network 100. In an embodiment, plan explainer 110 stores and retrieves supply chain master planning problem data, such as, for example, Linear Programming (LP) optimized plans of supply chain network 100, in database 220. As discussed in more detail below, server 210, which may operate on one or more computers, comprises plan solver 212, cause and effect accumulator 214, violation analyzer 216, and business level interpreter 218. In addition, although server 210 is shown and described as comprising a single plan solver 212, cause and effect accumulator 214, violation analyzer 216, and business level interpreter 218; embodiments contemplate any suitable number or combination of plan solvers, cause and effect accumulators, violation analyzers, and business level interpreters according to particular needs.

Database 220 comprises one or more databases or other data storage arrangements at one or more locations, local to, or remote from, server 210. Database 220 includes, for example, one or more data modules 222, one or more data models 224, and plan explanation datastore 226. As an example only and not by way of limitation, database 220 stores supply chain data, including one or more supply chain master planning problems of supply chain network 100 that may be used by server 210, and in particular, by plan solver 212. Data stored in one or more data modules 222 may be, for example, various decision variables, business constraints, goals and objectives of one or more supply chain entities 120.

As discussed in more detail below, plan explainer 110 models one or more supply chain master planning problems of supply chain network 100. That is, plan solver 212 of server 210 represents one or more supply chain entities 120 related to one or more supply chain master planning problems, in terms of a network of nodes and edges. In addition, or as an alternative, plan explainer 110 models the one or more supply chain master planning problems of one or more supply chain entities 120 to represent the flow of materials through supply chain network 100. In addition, supply chain network 100, including the one or more supply chain master planning problems is valid for a particular period of interest, i.e., a planning horizon. As discussed herein, plan explainer 110 generates a root cause analysis of objective violations for one or more supply chain master planning problems of supply chain network 100.

According to an embodiment, cause and effect accumulator 214 of server 210 processes, records, and stores in plan explanation datastore 226 variables, constraints, bounds, coefficients, changes, order of operations, and the like during hierarchical optimization. For example, during hierarchical optimization large numbers (e.g. millions) of variables are processed, some are set at bounds, singletons and doubletons are replaced by other variables. According to an embodiment, cause and effect accumulator 214 processes, records, and stores in plan explanation datastore 226 variables, constraints, bounds, coefficients, changes, order of operations, and the like during this process and intelligently gathers and establishes the relationship of those to be used during plan explanation.

Violation analyzer 216 of server 210 analyzes data stored in plan explanation datastore 226 and determines the root cause of plan exceptions. According to an embodiment, violation analyzer 216 responds to a user query or a standard batch query using root cause reporting logic 230. Root cause reporting logic 230 analyzes the data stored in plan explanation datastore 226 and generates a user queried multi objective violation root cause, which comprises, for example, why a goal violation occurred. According to another embodiment, root cause reporting logic 230 analyzes the data stored in plan explanation datastore 226 and generates a summarized multi-objective violation report which comprises the goal violations that occurred, such as, for example, demand shorted, demand lated, and/or material or resource shortage. According to an embodiment, violation analyzer 216 crawls through the data stored in plan explanation datastore 226 and determines, for one or more variables and/or objective levels, the identity of the variable and/or objective level, when the variable was fixed and/or modified during the planning solve, which variables and/or objective levels were instrumental in the fixing and/or modification of the variable, and other processes and causes as explained in this disclosure.

Business level interpreter 218 of server 210 collates and translates the reports or analysis provided by the goal violation analyzer into a user-friendly interpretation, such as a plain language (e.g. English, Spanish, German, Chinese, etc.) report or statement, which is preferably readily understood by a user of plan explainer 110. According to an embodiment, business level interpreter 218 comprises deciphering logic that analyzes variables and objective functions stored in plan explanation database 226 or output by violation analyzer 216 and provides an output in response to a submitted query. According to some embodiments, the translation provided by the business level interpreter is in the form of machine-readable output such that the translation is substantially machine actionable upon output by business level interpreter.

To further illustrate the operation of plan explainer 110 and one or more data models 224 an example is now given. In the following example, data model 224 represents one or more supply chain entities 120 related to one or more supply chain master planning problems, in terms of a network of nodes and edges and the flow of materials through a supply chain entity 120. An item is represented as a node (triangle), where a first production process (Prod 1) transforms the raw material (RM) into an intermediate good (IM), having a first resource (RES 1). The second production process (Prod 2) transforms the intermediate good (IM) into item 2 (finished good) or the third production process (Prod 3) transforms the intermediate good (IM) into item 3 (finished good) both having a second resource (RES 2). In addition, or as an alternative, item 2 and/or item 3 are manufactured at Plant 1 and are moved through a transportation operation to Distribution Center 1 (DC 1). Although, a simplified exemplary supply chain network is shown and described having a single location; embodiments contemplate any number of items, raw materials, resources, assembly operations, finished goods, nodes, and edges, according to particular needs.

As another example, data model 224 represents another one or more supply chain entities 120 related to one or more supply chain master planning problems, in terms of a network of nodes and edges and the flow of materials through a supply chain entity 120. In this example, the supply chain entity represented by data model 224 is more complex than the supply chain entity represented by data model 224, discussed above. For example, there may be multiple manufacturing plants across multiple locations, having particular lead times to move the items, transportation times, production times and cycle times. In addition, an item may be represented as a node (triangle), where a first production process transforms the raw material into an intermediate good A, intermediate good B, or intermediate good C; and multiple resources and multiple stages of production processes transform the intermediate goods into either item 1, item 2, item 3 or item 4.

Although one or more data models 224 are shown and described as comprising particular supply chain representations and configurations, including nodes and edges; embodiments contemplate any suitable supply chain representation, configuration or any combination of nodes and edges. As an example only and not by way of limitation, the number of stages in supply chain entity 120 are likely to be in the range of 10-20 stages, including multiple locations, items in the range of 500,000, business constraints in the range of 20-30, and the number of demands in the order of millions. In addition and as discussed in more detail below, one or more data models 224 may include one or more business constraints, operation constraints and resource constraints.

Figure 3:
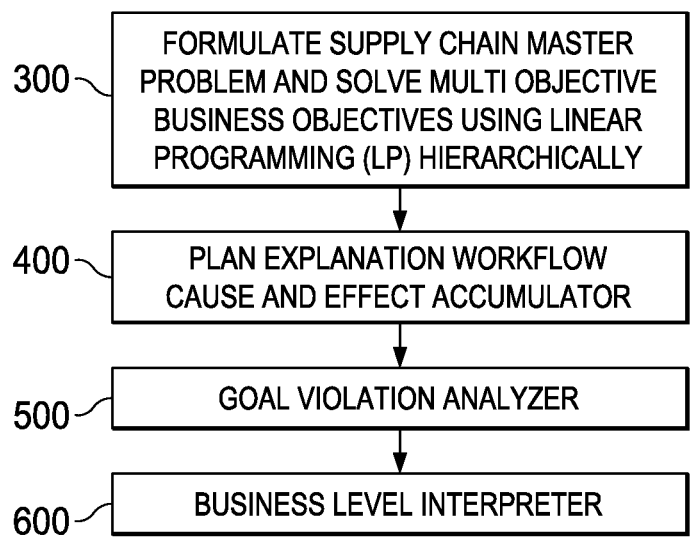
FIG. 3 illustrates an exemplary method of an overall process of plan explanation.

Plan explanation datastore 226 of database 220 stores logged data generated during solving of supply chain plan as discussed in more detail below. For example, plan explanation datastore 226 may store data generated by plan solver 212 and cause and effect accumulator 214 and provide data to violation analyzer 216 and business level interpreter 218 as explained in more detail below. FIG. 3 illustrates an exemplary method of an overall process of the various components of plan explainer 110. In one embodiment, plan solver 212 of plan explainer 110 provides for formulating supply chain master problems and solving a hierarchy of multi-objective business objectives using linear programming (LP) at activity 300. According to an embodiment, cause and effect accumulator 214 performs a plan explanation workflow and stores cause and effect audit trail at activity 400. Violation analyzer 215 performs goal violations analysis at activity 500. Business level interpreter 218 performs business level interpretation at activity 600.

As discussed above, with respect to data models 224, plan explainer 110 models a supply chain scenario of supply chain network 100 as a network of nodes and edges. The material storage and/or transition units are modeled as nodes, which may be referred to as, for example, buffer nodes, buffers or nodes. Various transportation or manufacturing processes are modeled as edges connecting the nodes. The planning horizon is broken down into elementary time-units, such as, for example, time-buckets, or, simply, buckets. The edge between two buffer nodes denote processing of material and the edge between different buckets for the same buffer indicates inventory carried forward. Flow-balance constraints for most, if not every buffer in every bucket, model the material movement in the entire supply chain network 100.

As an example only and not by way of limitation, an exemplary supply chain network may have particular relationships between items and processes including nodes and edges. In this example, the exemplary supply chain network may include three items and two intermediate processes. As discussed above, one or more supply chain entities 120 represent one or more supply chain networks. Although, an exemplary supply chain network is described as including a particular number of items and processes; embodiments contemplate any number of items or processes associated with any supply chain entity, according to particular needs.

In addition and as discussed above, a planning horizon may be broken down into any number of time-units, in this example, the planning time-line is broken down into a number of discrete time-buckets, i.e., seven sequential time buckets. The storage at the start of these buckets is represented by three nodes, which correspond to material storage and/or transition units of the three items. The transformation of the first item to the second item and the second item to the third item is represented by a set of edges connecting these nodes. In one embodiment, these edges are characterized as a first process (between the first and second nodes) and a second process (between the second and third nodes). The lead times of the transformation processes are represented by the differences between the start-bucket and end-bucket of the edges. Thus, if each of the seven time-buckets represent one day, the first process may take one day, while the second process may take three days.

It should be noted that the item and process described herein is a simplified description for the purpose of illustration. For example, the items may be different sizes, styles, states of same or different physical material typically used in supply chain network 100. Similarly, a process may be any manufacturing, distribution, transportation or any other operation typically used in supply chain network 100. In one embodiment, additional constraints may be added to facilitate other planning rules. The business objectives are prioritized and modeled as hierarchy of objective functions. This model is a linear programming (LP) problem which does not consider discrete variables or constraints. For the sake of simplicity, and without loss of generality, all the objective functions are assumed to be minimized. If any objective function is to be maximized, the objective is negated and minimized for same effect.

In addition, although FIG. 3 illustrates one embodiment of a method of representing a supply chain scenario of one or more supply chain entities 120 as a network of nodes and edges and formulating supply chain master problems and solving a hierarchy of multi-objective business objectives goals using linear programming (LP), various changes may be made to the method without departing from the scope of embodiments described herein.

Figure 4:
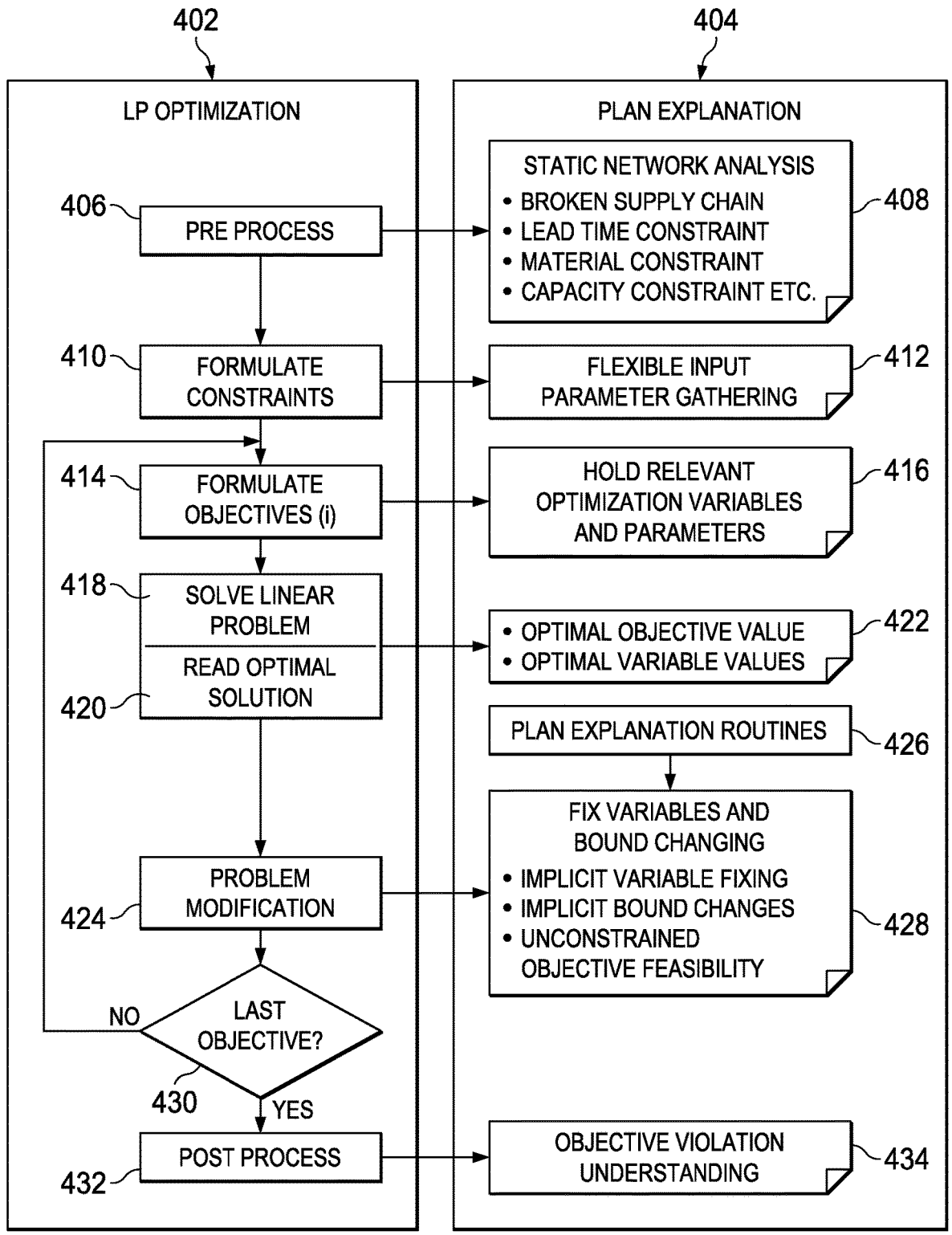
FIG. 4 illustrates an exemplary method of processing a multi-objective hierarchical linear optimization.

FIG. 4 illustrates an exemplary method of processing a multiple-objective hierarchical linear optimization according to an embodiment. The process of a multi-objective hierarchical linear planning problem proceeds by one or more activities, which although described in a particular order may be performed in one or more permutations, according to particular needs. The method comprises two sub-methods that may be performed simultaneously or substantially simultaneously. The first half, linear programming optimized solution method 402 optimizes and solves a multi-objective hierarchical planning problem using plan solver 212. The second half, plan explanation method 404 is performed using cause and effect accumulator 214, which analyzes, records, and stores in plan explanation datastore 226 various variables, constraints, bounds, coefficients, changes, order of operations, and the like as they are performed or changed according to the linear programming optimized solution method 402.

The method begins at activity 406, where plan solver 212 performs pre-processing of the hierarchical linear programming problem. At activity 408, cause and effect accumulator 214 performs and records static network analysis, which comprises analyzing, fixing, or solving broken supply chain, determining lead-time constraints, determining material constraints, and determining capacity constraints. At activity 410, plan solver 212 formulates constraints. At activity 412, flexible input parameters are gathered by cause and effect accumulator 214 and stored in plan explanation datastore 226. At activity 414, plan solver 212 formulates one or more objectives (i). At activity 416, cause and effect accumulator 214, holds relevant optimization variables and parameters and records the held variables and parameters in plan explanation datastore 226. At activity, 418, plan solver 212 solves the linear problem. According to some embodiments, plan solver 212 solves the linear problem using a mathematical optimization tool. At activity 420, plan solver 212 reads the solution of the optimized supply chain planning Linear Problem.

At activity 422, cause and effect accumulator 214 solves and records one or more optimal objective values and one or more optimal variable values. At activity 424, plan solver 212 performs problem modification such as modifying the problem suitably to ensure that a solved oblevel is not affected by further processing and oblevel solves. At activity 426, cause and effect accumulator 214 initiates plan explanation routines. At activity 428, cause and effect accumulator 214 performs variable fixing and bound changing and tests unconstrained objective feasibility. Also at activity 428, cause and effect accumulator 214 records the results in plan explanation datastores 226. At activity 430, plan solver determines whether the last objective of the supply chain planning problem has been processed. If not, the LP optimizes solution method 402 returns to activity 414. If the last objective has been processed, method 402 continues to activity 432. At activity 432, plan solver 212 performs post processing on the supply chain planning problem and any solutions generated. At activity 434, cause and effect accumulator 214 performs objective violation understanding and stores the results in plan explanation datastore 226.

Figure 5:
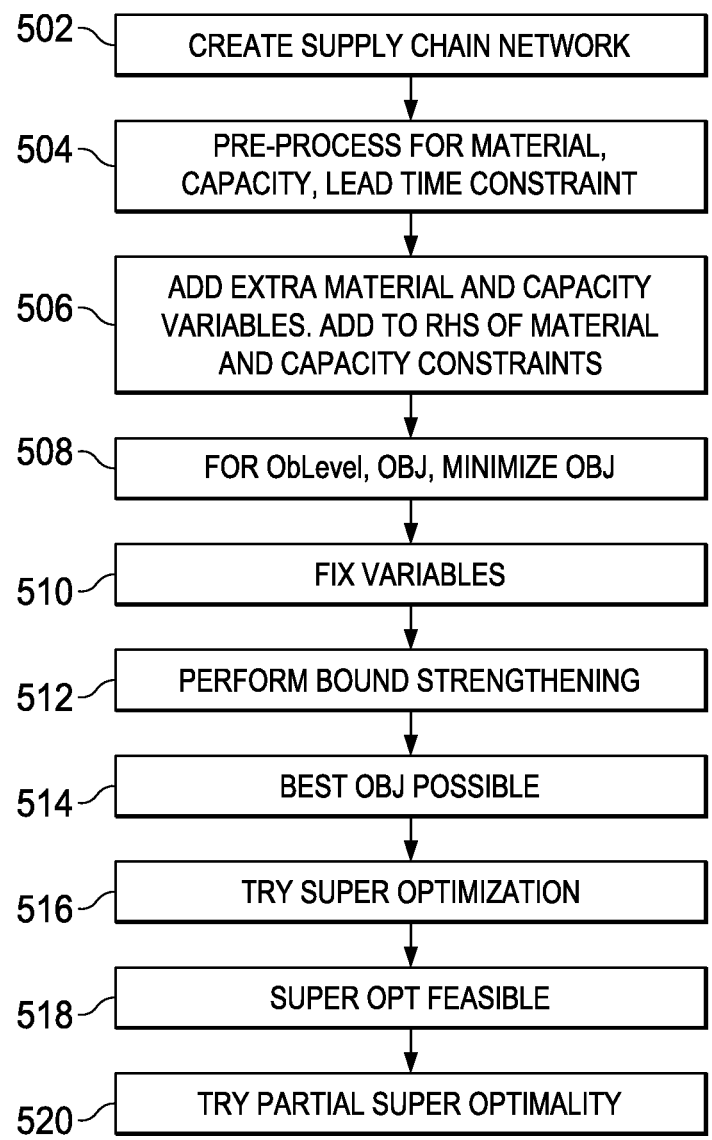
FIG. 5 illustrates an exemplary method of optimization, processing, and recording of a multi-objective hierarchical linear optimization according to an embodiment.

FIG. 5 illustrates an exemplary method of optimization, processing, and recording of a multi-objective hierarchical linear optimization. The process of optimization and processing of a multi-objective hierarchical linear optimization proceeds by one or more activities, which although described in a particular order may be performed in one or more permutations, according to particular needs. The method begins at activity 502, where plan explainer 110 models a supply chain scenario of supply chain network 100 as a network of nodes and edges and formulates supply chain master problems with multiple objectives. As an example only and as discussed above, data models 224 represents one or more supply chain entities 120 related to one or more supply chain master planning problems, in terms of a network of nodes and edges and the flow of materials through a supply chain entity 120. Plan explainer 110 then parses the one or more supply chain master planning problems of the supply chain scenario of data models 224 and captures, records and logs data of the multi-objective hierarchical linear optimization and stores the logged data in database 220.

At activity 504, plan explainer 110 performs pre-processing of material, capacity and lead time constraints and records any bound data in database 220, such as, for example, unfixed upper bound and lower bound data. In addition, the pre-processing indicates any data error present in the supply chain scenario of data models 224. At activity 506, plan explainer 110 adds one or more logical variables to the logged data, i.e. to the right hand side (RHS) of one or more constraint equations and records the additional data in database 220. According to some embodiments, one or more logical variables comprise extra material and capacity variables, safety stock constraints, product mix constraints, or the like. According to some embodiments, these one or more logical variables are added to the logged data, such as, for example, the RHS of material and capacity constraints and the additional data is recorded in database 220, such as, for example, capacity i and material j in bucket t.

At activity 508, plan explainer 110 captures, records and logs data for objective level, OBJ, minimize Obj. That is, for every business objective or objective level, plan explainer 110 minimizes the business objective violation and records additional data about the objective coefficients for every variable. At activity 510, plan explainer 110 fixes the variables to ensure that the highest objectives are not negated by this process and records the additional data in database 220. As an example only and not by way of limitation, plan explainer 110 fixes the variables, as shown below:

If RC<0, CurentLB=CurrentUB=Unfixed_UB, RECORD VAR_FIX

If RC>0, CurrentLB=CurrentUB=Unfixed_LB, RECORD VAR_FIX

Not all candidate variables explicitly fixed

At activity 512, plan explainer 110 performs additional bound strengthening which determines which are the variables and which were the bounds that were changed by this objective function. In one embodiment, plan explainer 110 performs bound strengthening, as shown below:

Change UB & LB for all variables, RECORD PRESLV_BDCHG_LB & PRESLV_BDCHG_UB

If UB==LB, fix the variable, RECORD PRESLV_FIX_

These changes go into regular LP Optimization workflow

The logged data is stored in database 220 and exemplary log data is shown below:

Error.log

------------

ERROR017: Delivery operation 'Delop_Item_3' not created for 'Item3'

Delivery Operation 'Delop_Item_2', var AMT100001001, demand 1800, price 0

========================

1_PRESLV_BDCHG_UB: var AMT100001001 index 36 UB 1800 changed to 600

2_VAR_FIX: var AMT100001001 index 36 fixed at 600

2_VAR_FIX: var AMT100001001 index 36 fixed at 600

2_OBJ_COEF: var AMT100001001 index 36 objCoef −3 value 600

3_OBJ_COEF: var AMT100001001 index 36 objCoef 3.20000005 value 600

After the Objective level function is called, plan explainer 110 determines the best possible value of the objective function, at activity 514. For example, if demand satisfaction is being maximized, plan explainer 110 determines if all of the demand is satisfied to the best possible value. At activity 516, plan explainer 110 performs a super optimization that generates modifications in terms of the objective coefficients and also in terms of the bounds, and monitors any changes in the problem of the previous objectives. That is, plan explainer 110 determines if the problem is feasible, and if so, then super optimality is achieved, as shown in the exemplary data below:

Check Feasibility of Relaxed Problem, separate from regular LP Flow:
1) For Every Obj Variable, change bounds
   1.1) if ObjCoef<0 Set to Unfixed_UB
   1.2) if ObjCoef>0 Set to Unfixed_LB
   1.3) if ObjCoef==0
      1.3.1) Var is Mat or Cap,
         1.3.1.1) Set LB=0
         1.3.1.2) Set UB=Inf
      1.3.1.2) Otherwise
         1.3.2.1) Set LB=UnfixedLB
         1.3.2.2) Set UB=UnfixedUB
2) Check Feasibility of the problem and record status. (Call CPXPresolve of CPLEX solver) OBJ_FULLPRESOLVE_STATUS At activity 518, plan explainer 110 determines if super optimality was possible, if not, plan explainer 110 determines how to super optimize the problem even if sufficient materials and capacity or sufficient flexibility is present in the input parameters. In one embodiment, plan explainer 110 determines if super optimality was feasible, as shown below:

Super Optimization Status==0 (super optimization possible with relaxed inputs)
1) For every variables
   1.1) If (value<unfixedLB) OR (value>unfixedUB)
   (Means input flexing would be needed for super optimal solution)
   RECORD_OBJ_FULLPRESOLVE_ORIG_LB_CHG OR
   _OBJ_FULLPRESOLVE_ORIG_UB_CHG
   1.2) If (unfixedLB<value<unfixedUB) AND
      1.2.1) (value<currentLB)
      (Means for super optimal solution, previous oblevels would be affected)
      RECORD_OBJ_FULLPRESOLVE_CURR_LB_CHG
      1.2.2) (value>currentUB)
      (Means for super optimal solution, previous oblevels would be affected)
      RECORD_OBJ_FULLPRESOLVE_CURR_UB_CHG At activity 520, plan explainer 110 performs a partial super optimality. After the data is recorded, plan explainer 110 analyzes the log files to identify the variables, as shown in the exemplary data below:

Super optimization possible with relaxed inputs. It can happen if there are conflicting variables in objective function. Try minimization & maximization super optimization
1. Try super optimization for +ve ObjCoef
   1.1. For Every Variable
      1.1.1. If ObjCoef>0, Fix the variable at unfixedLB
      1.1.2. Else set ObjCoef=0
   1.2. For every variable, change the bounds
      1.2.1. If inputType==Input
         1.2.1.1. Set LB=0, UB=INF
      1.2.2. Else
         1.2.2.1. Set LB=UnfixedLB, UB=UnfixedUB
   1.3. Call CPXPresolve, get Status
   1.4. If Status==0
      1.4.1. RECORD_OBJ_POSITIVE_BOUND_RELAX_STATUS
   Try super optimization for −ve ObjCoef, similarly, RECORD
      _OBJ_NEGATIVE_BOUND_RELAX_STATUS To further explain the operation of FIG. 5 and the process of analyzing logged data of exception and goal violations of a multi-objective hierarchical linear optimization, an example is now given. In the following example, and as discussed above, data models 224 represents a supply chain scenario where a first production process transforms the raw material (RM) into an intermediate good (IM), having a first resource (RES 1). The second production process (Prod 2) transforms the intermediate good (IM) into item 2 (finished good) or the third production process (Prod 3) transforms the intermediate good (IM) into item 3 (finished good) both having a second resource (RES 2). In addition, a first objective level (objective function 1) of the supply chain scenario of data models 224 is that item 2 cannot be held in stock i.e., the max safety stock for item 2 is zero which means that the supply chain scenario cannot hold anything more than 0. The second objective level (objective function 2) is to try to provide item 2 for 1800 units.

Plan explainer 110 parses the error logs and, in this example, determines that "Delop_Item_3" which was supposed to be the delivery operation of item 3 was actually not created, because there was some problem in the data itself, which indicates a broken link in the supply chain scenario, as shown below, in the exemplary data log:

ERROR017: Delivery operation 'Delop_Item_3' not created for 'Item3'
Delivery Operation 'Delop_Item_2', var AMT100001001, demand 1800, price 0

In addition, for the second demand that was given in Layer 1, plan explainer 110 determines that this is the variable (var AMT100001001) that should have been optimized in an objective function. Plan explainer 110 then parses the logged data, for this variable (var AMT100001001) to find these lines:

1_PRESLV_BDCHG_UB: var AMT100001001 index 36 UB 1800 changed to 600
2_VAR_FIX: var AMT100001001 index 36 fixed at 600
2_VAR_FIX: var AMT100001001 index 36 fixed at 600
2_OBJ_COEF: var AMT100001001 index 36 objCoef −3 value 600
3_OBJ_COEF: var AMT100001001 index 36 objCoef 3.20000005 value 600

As shown in the exemplary logged data above, the first number represents the objective function (1, 2, 3) during which plan explainer 110 recorded this data. The second part (PRESLV_BDCHG_UB) is the kind of information provided in the particular line. For example, as shown above, in objection function 1, in the pre-solve state, there was a bound change for the upper bound for variable (var AMT100001001) and the upper bound was really 1800 (UB 1800) and was (changed to 600). In addition, objective function 2 fixed variable (var AMT100001001) by setting the upper and lower bound to the same value (600). Also, objective function 2 has a negative objective coefficient for this variable (objCoef −3 value 600):

2_OBJ_COEF: var AMT100001001 index 36 objCoef −3 value 600
3_OBJ_COEF: var AMT100001001 index 36 objCoef 3.20000005 value 600

As shown above, plan explainer 110 identifies the Opt_Obj (objective responsible for optimizing the variable), and then determines for all the objectives before that, which would have changed the bounds on this particular variable (i.e., objective 1 constricted to 600):

1_PRESLV_BDCHG_UB: var AMT100001001 index 36 UB 1800 changed to 600

Therefore, objective function 2 is a demand satisfaction objective and objective function 1 is the maximum safety stock objective, and comparing these two, plan explainer 110 determines, in this example, that it is the maximum safety stock that is forcing the demand to be constrained at 600 units.

After a root cause of a goal violation of the first objective level and the second objective level of the supply chain scenario is determined, plan explainer 110 generates an optimum inventory level and adjusts one or more supply chain entities 120 accordingly. In one embodiment, plan explainer 110 adjusts the product mix ratios, inventory levels at various stocking points, and sourcing of one or more supply chain entities 120 based on various root causes of goals and/or objective violations. In addition, or as an alternative, at least one of the one or more supply chain entities 120 transforms a state of the supply chain according to the one or more items by adjusting inventory levels of the one or more items according to the optimum inventory level. For example, plan explainer 110, places an order with a supplier, a manufacturer and/or a distribution center for the one or more items. Based on this order, a supplier provides one or more items to one or more manufacturers. The one or more manufactures then uses the one or more items during the manufacturing process to produce the one or more items and provides the one or more items to a distribution center. The distribution center then distributes the one or more items to one or more retailers and the method ends.

In addition, although FIG. 5 illustrates one embodiment of an exemplary method of optimization, processing and analyzing logged date of a multi-objective hierarchical linear optimization, various changes may be made to method 400 without departing from the scope of embodiments described herein.

Reference in the foregoing specification to "one embodiment", "an embodiment", or "another embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope described herein.

What is claimed is:

1. A system for iteratively optimizing a supply chain network, comprising:
    a supply chain network comprising one or more entities and one or more items;
    a computer comprising a processor and a memory, the computer configured to optimize a supply chain plan by:
        modeling the supply chain network as a directed graph of nodes and edges and one or more multi-objective business objectives as a hierarchy of objective functions, wherein the hierarchy of objective functions is defined as objective levels (oblevels);
        traversing the hierarchy of objective functions at each objective level (oblevel) from lowest to highest;
        solving the hierarchy of objective functions at each objective level (oblevel) comprising the modeled supply chain network and the one or more multi-objective business objectives, using one or more hierarchical optimizations by iteratively performing the following steps:
            storing in the database an unfixed upper bound and an unfixed lower bound according to a model of the supply chain network and a preprocessing of constraints, the unfixed upper bound and the unfixed lower bound stored as plan explanation data in a processing log;
            at each objective level (oblevel) optimization, ensuring that optimization at a given objective level (oblevel) does not affect objective levels (oblevels) previously solved to converge to an optimal solution after all objective levels have been optimized and storing in the database the objective coefficient for the corresponding objective level (oblevel); and
            at each variable fixing, inspecting a reduced cost and value, and when the reduced cost is greater than 0, fixing and storing in the database the lower bound and when the reduced cost is less than 0, fixing and storing in the database the upper bound;
        further optimizing the optimized objective levels (oblevels) by modifying the objective coefficients and bounds while monitoring any changes to determine a feasible solution that is further determined to be a superoptimal solution;
        calculating an optimum inventory level based on the superoptimal solution; and
        querying the plan explanation data in the processing log to identify one or more objective violation root causes.

2. The system of claim 1, wherein the constraints comprise material, capacity and lead time.

3. The system of claim 2, wherein storing plan explanation data further comprises:
    comparing the fixed lower bound and the fixed upper bound;
    when the fixed upper bound and the fixed lower bound tighten the bounds of a linear programming problem based on the hierarchy of objective functions, storing in the database the tightened bound; and
    when the fixed upper bound and the fixed lower bound are the same, fixing and storing the variable of the objective function.

4. The system of claim 3, wherein the computer further:
    performs bound relaxation on the linear programming problem by:
        fixing the variable to the unfixed upper bound when the objective coefficient is less than 0;
        fixing the variable to the unfixed lower bound when the objective coefficient is greater than 0;
        fixing the lower bound to zero and the upper bound to infinity, when the objective coefficient is zero and the variable is of an input type;
        fixing the lower bound to the unfixed lower bound and the upper bound to the unfixed upper bound, when the objective coefficient is zero and the variable is not an input type; and
        storing in the database any of the fixed upper bounds and fixed lower bounds.

5. The system of claim 4, wherein retrieving plan explanation data comprises:
    generating a plan analysis output comprising fixed variables and fixed bounds recorded by the computer;
    filtering variables by type;
    retrieving variables related to a queried type of variable;
    scanning the plan analysis output to identify when the queried variable was fixed;
    determining which oblevel correlates to a maximizing or minimizing of the queried variable;

identifying the first objective which contains the queried variable;
when the objective coefficient is positive, identifying the objective which changed the lower bound of the variable;
when the objective coefficient is negative, identifying the objective which changed the upper bound of the variable; and
performing a relaxation analysis.

6. The system of claim 5, wherein the one or more entities transforms a state of the supply chain according to the one or more items by one or more of:
meeting a demand;
adhering to product mix limits;
adhering to safety stock limits;
minimizing inventory;
maintaining a predetermined material or capacity;
using a predetermined resource;
maintaining proportional sourcing;
reducing use of alternate materials; and
optimizing profit.

7. A method for iteratively optimizing a supply chain network, comprising:
modeling, by a computer, a supply chain network comprising one or more entities and one or more items;
modeling, by the computer, one or more multi-objective business objectives as a hierarchy of objective functions, wherein the hierarchy of objective functions is defined as objective levels (oblevels);
traversing the hierarchy of objective functions at each objective level (oblevel) from lowest to highest;
solving, by the computer, the hierarchy of objective functions at each objective level (oblevel) comprising the modeled supply chain network and the one or more multi-objective business objectives, using one or more hierarchical optimizations by iteratively performing the following steps:
storing in the database an unfixed upper bound and an unfixed lower bound according to a model of the supply chain network and a preprocessing of constraints, the unfixed upper bound and the unfixed lower bound stored as plan explanation data in a processing log;
at each objective level (oblevel) optimization, ensuring that optimization at a given objective level (oblevel) does not affect objective levels (oblevels) previously solved to converge to an optimal solution after all objective levels have been optimized and storing in the database the objective coefficient for the corresponding objective level (oblevel); and
at each variable fixing, inspecting a reduced cost and value, and when the reduced cost is greater than 0, fixing and storing in the database the lower bound and when the reduced cost is less than 0, fixing and storing in the database the upper bound;
further optimizing the optimized objective levels (oblevels) by modifying the objective coefficients and bounds while monitoring any changes to determine a feasible solution that is further determined to be a superoptimal solution;
calculating an optimum inventory level based on the superoptimal solution; and
querying the plan explanation data in the processing log to identify one or more objective violation root causes.

8. The method of claim 7, wherein the constraints comprise material, capacity and lead.

9. The method of claim 8, wherein storing plan explanation data further comprises:
comparing, by the computer, the fixed lower bound and the fixed upper bound; and
when the fixed upper bound and the fixed lower bound tighten the bounds of a linear processing problem based on the hierarchy of objective functions, storing, by the computer, the tightened bound in the database; and
when the fixed upper bound and the fixed lower bound are the same, fixing, by the computer, the variable of the objective function.

10. The method of claim 9, further comprising:
performing, by the computer, bound relaxation on the linear processing problem by:
fixing the variable to the unfixed upper bound when the objective coefficient is less than 0;
fixing the variable to the unfixed lower bound when the objective coefficient is greater than 0;
fixing the lower bound to zero and the upper bound to infinity, when the objective coefficient is zero and the variable is of an input type; and
fixing the lower bound to the unfixed lower bound and the upper bound to the unfixed upper bound, when the objective coefficient is zero and the variable is not an input type.

11. The method of claim 10, wherein retrieving the plan explanation data comprises:
generating a plan analysis output comprising fixed variables and fixed bounds recorded by the computer;
filtering variables by type;
retrieving variables related to a queried type of variable;
scanning the plan analysis output to identify when the queried variable was fixed;
determining which oblevel correlates to a maximizing or minimizing of the queried variable;
identifying the first objective which contains the queried variable;
when the objective coefficient is positive, identifying the objective which changed the lower bound of the variable;
when the objective coefficient is negative, identifying the objective which changed the lower bound of the variable; and
performing a relaxation analysis.

12. The method of claim 11, wherein transforming, by the one or more entities, a state of the supply chain according to the one or more items comprises:
meeting a demand;
adhering to product mix limits;
adhering to safety stock limits;
minimizing inventory;
maintaining a predetermined material or capacity;
using a predetermined resource;
maintaining proportional sourcing;
reducing use of alternate materials; and
optimizing profit.

13. A non-transitory computer-readable medium comprising software for iteratively optimizing a supply chain network, the software when executed configured to:
model a supply chain network as a directed graph of nodes and edges;
model one or more multi-objective business objectives as a hierarchy of objective functions, wherein the hierarchy of objective functions is defined as objective levels (oblevels);
traverse the hierarchy of objective functions at each objective level (oblevel) from lowest to highest;

solve the hierarchy of objective functions at each objective level (oblevel) comprising the modeled supply chain network and the one or more multi-objective business objectives, using one or more hierarchical optimizations by iteratively performing the following steps:

storing in the database an unfixed upper bound and an unfixed lower bound according to a model of the supply chain network and a preprocessing of constraints, the unfixed upper bound and the unfixed lower bound stored as plan explanation data in a processing log;

at each objective level (oblevel) optimization, ensuring that optimization at a given objective level (oblevel) does not affect objective levels (oblevels) previously solved to converge to an optimal solution after all objective levels have been optimized and storing in the database the objective coefficient for the corresponding objective level (oblevel); and at each variable fixing, inspecting a reduced cost and value, and when the reduced cost is greater than 0, fixing and storing in the database the lower bound and when the reduced cost is less than 0, fixing and storing in the database the upper bound;

further optimizing the optimized objective levels (oblevels) by modifying the objective coefficients and bounds while monitoring any changes to determine a feasible solution that is further determined to be a superoptimal solution;

calculate an optimum inventory level based on the superoptimal solution; and querying the plan explanation data in the processing log to identify one or more objective violation root causes.

14. The non-transitory computer-readable medium of claim 13, wherein the constraints comprise material, capacity and lead.

15. The non-transitory computer-readable medium of claim 14, wherein the software stores plan explanation data further by:

comparing fixed lower bound and the fixed upper bound;

when the fixed upper bound and the fixed lower bound tighten the bounds of a linear processing problem based on the hierarchy of objective functions, storing the tightened bound in the database; and when the fixed upper bound and the fixed lower bound are the same, fixing the variable of the objective function.

16. The non-transitory computer-readable medium of claim 15, wherein the software is further configured to:

perform bound relaxation on the linear processing problem by:

fixing the variable to the unfixed upper bound when the objective coefficient is less than 0;

fixing the variable to the unfixed lower bound when the objective coefficient is greater than 0;

fixing the lower bound to zero and the upper bound to infinity, when the objective coefficient is zero and the variable is of an input type; and fixing the lower bound to the unfixed lower bound and the upper bound to the unfixed upper bound, when the objective coefficient is zero and the variable is not an input type.

17. The non-transitory computer-readable medium of claim 16, wherein the software retrieves the plan explanation data by:

generating a plan analysis output comprising fixed variables and fixed bounds;

filtering variables by type;

retrieving variables related to a queried type of variable;

scanning the plan analysis output to identify when the queried variable was fixed;

determining which oblevel correlates to a maximizing or minimizing of the queried variable;

identifying the first objective which contains the queried variable;

when the objective coefficient is positive, identifying the objective which changed the lower bound of the variable;

when the objective coefficient is negative, identifying the objective which changed the lower bound of the variable; and performing a relaxation analysis.

\* \* \* \* \*